(12) United States Patent
Dreisinger et al.

(10) Patent No.: US 9,039,806 B2
(45) Date of Patent: May 26, 2015

(54) RECYCLING OF SOLIDS IN OXIDATIVE PRESSURE LEACHING OF METALS USING HALIDE IONS

(75) Inventors: David B. Dreisinger, Delta (CA); Chris A. Fleming, Lakefield (CA)

(73) Assignee: International PGM Technologies, Delta, British Columbia (CA)

( * ) Notice: Subject to any disclaimer, the term of this patent is extended or adjusted under 35 U.S.C. 154(b) by 1465 days.

(21) Appl. No.: 12/300,993

(22) PCT Filed: May 11, 2007

(86) PCT No.: PCT/CA2007/000842
§ 371 (c)(1),
(2), (4) Date: Feb. 3, 2009

(87) PCT Pub. No.: WO2007/143870
PCT Pub. Date: Dec. 21, 2007

(65) Prior Publication Data
US 2010/0018351 A1    Jan. 28, 2010
US 2010/0206135 A2    Aug. 19, 2010

Related U.S. Application Data (60) Provisional application No. 60/800,044, filed on May 15, 2006.

(51) Int. Cl.
*C22B 11/00* (2006.01)
*C22B 3/00* (2006.01)
*C22B 3/10* (2006.01)
*C22B 15/00* (2006.01)

(52) U.S. Cl.
CPC . *C22B 11/04* (2013.01); *C22B 3/10* (2013.01); *C22B 15/0067* (2013.01); *C22B 23/0415* (2013.01)

(58) Field of Classification Search
USPC .................................................. 75/744, 743
See application file for complete search history.

(56) References Cited

U.S. PATENT DOCUMENTS

| | | |
|---|---|---|
| 4,605,439 A | 8/1986 | Weir |
| 5,232,491 A | 8/1993 | Corrans et al. |
| 5,650,057 A | 7/1997 | Jones |
| 6,315,812 B1 | 11/2001 | Fleming et al. |

FOREIGN PATENT DOCUMENTS

GB      2128597      5/1984

OTHER PUBLICATIONS

Official Action, dated Nov. 1, 2012, issued in corresponding Finnish Patent Application No. 20086081.

*Primary Examiner* — Rebecca Lee
(74) *Attorney, Agent, or Firm* — Klarquist Sparkman, LLP (57) ABSTRACT

The invention provides a recycling step in an oxidative pressure leaching process for recovery of metals using halide ions, in which a portion of the leached solids are recycled back to the feed to the autoclave, to allow two or more passes through the high temperature leaching step.

11 Claims, 5 Drawing Sheets

RECYCLING OF SOLIDS IN OXIDATIVE PRESSURE LEACHING OF METALS USING HALIDE IONS

CROSS REFERENCE TO RELATED APPLICATIONS

This is the U.S. National Stage of International Application No. PCT/CA2007/000842, filed May 11, 2007 (published in English under PCT Article 21(2)), which claims the benefit of U.S. Provisional Application No. 60/800,044, filed May 15, 2006, each of which is incorporated herein by reference.

FIELD OF THE INVENTION

The invention is in the field of hydrometallurgy.

BACKGROUND OF THE INVENTION

U.S. Pat. No. 6,315,812 issued to Fleming, et al. Nov. 13, 2001, describes an oxidative pressure leaching process for recovery of metals using halide ions. The method disclosed therein comprises the steps of subjecting the host material to an oxidative pressure leach process, in the presence of a halide ion constituent which is reactive with the precious metal, at a temperature sufficient to cause at least a portion of the precious metal to be extracted by a leach solution; and recovering the precious metal from the leach solution.

In accordance with the process described in U.S. Pat. No. 6,315,812, one or a number of the precious metals and base metals may be leached from the host material in a single oxidative pressure leach process, whose leach solution may be treated to recover the individual precious and base metals, as desired, and the reaction can occur with a relatively low concentration of halide ion in the leach solution, provided the selected halide ion is sufficiently reactive with the precious metals being recovered. The method involves the following steps: i) subjecting the host material to an oxidative pressure leach process, in the presence of a leach solution bearing halide ion constituent which is reactive with the precious metal, and at a temperature sufficient to cause at least a portion of the precious metal to be extracted by the leach solution; and ii) recovering the precious metal from the leach solution. The host material may be a sulphide ore or ore concentrate. The sulphide ore or ore concentrate may contain economic quantities of base metals, for example copper, nickel, cobalt or zinc. During pressure leaching in the presence of oxygen, the sulphide component of the host material is oxidized to form sulphuric acid in solution. In which case, the process takes place in an acidic environment ranging from 20 to 100 g/L sulphuric acid. In effect, the acid is produced during the sulphide oxidation reaction. The base metals are co-leached or solubilised in the same acid solution. Accordingly, the leaching of precious metals and base metals from the host material occurs in the presence of sulphuric acid, and in alternative embodiments may take place at a temperature of at least 200 degrees Celsius, at temperatures below 200 degrees Celsius and at temperatures as high as economically achievable. The temperature selected for the pressure leach reaction depends on the mineralogical characteristics and particle size of the feed material, the concentration of precious metals in the feed material, the acid strength, the oxygen partial pressure and the residence time in the pressure leaching vessel. When the halide ion is a chloride, the chloride salt may be selected from sodium chloride, calcium chloride or potassium chloride. Hydrochloric acid may also be used as a source of chloride. In selected embodiments, the salt is sodium chloride and is provided at a concentration ranging from about 1 g/L to about 100 g/L, or from 2 to 20 g/L, or from 5 to 15 g/L, or from 8 to 12 g/L. In one embodiment, the chloride salt is sodium chloride at a concentration of about 10 g/L in solution. The optimum concentration of the chloride ion may be higher with increasing concentration of the precious metal being recovered.

In some embodiments of the Fleming et al. process, the oxidative pressure leach process takes place in the presence of a gaseous oxidant. The gaseous oxidant may be oxygen gas, and the oxygen gas may be injected into the vessel at an oxygen partial pressure of between 1 and 500 psig, or between 10 and 200 psig, or between 50 and 100 psig.

In the Fleming et al. process, once the precious metals are in solution, and the solution is separated from the leached solid residue, a number of approaches may be selected to recover the precious metal constituent first, such as by the use of activated carbon adsorption or ion exchange resin adsorption, or reduction/precipitation with a mixture of sulphur dioxide and sodium hydrosulfide, as well as copper cementation or cementation on a metal sulphide such as copper sulphide. In the case of adsorption on activated carbon or ion exchange resins, the precious metals constituent may be recovered directly, if desired, from the acidic pulp phase prior to solid liquid separation, which may be advantageous in some circumstances.

In some embodiments of the Fleming et al. process, the autoclave residence time for leaching of metals may be relatively long, such as two or more hours, to achieve acceptable levels of metal recovery.

SUMMARY OF THE INVENTION

The invention provides a recycling step in an oxidative pressure leaching process for recovery of metals using halide ions, in which a portion of the leached solids are recycled back to the feed to the autoclave, to allow two or more passes through the high temperature leaching step. The effective residence time of the solids in the high temperature leaching process is extended due to recycling, allowing for greater overall extraction of valuable metals from the original solid feed.

In one aspect, the invention provides a method for recovering metals from a host material, comprising the steps of: (i) subjecting the host material to an oxidative pressure leach process, in the presence of a leach solution bearing a halide ion constituent which is reactive with the metal, at a temperature sufficient to cause at least a portion of the precious metal to be extracted into a leachate solution to provide leached solids; (ii) separating the barren solid from the leachate solution; (iii) recovering a metal from the leachate solution; and, (iii) recycling at least a portion of the leached solids to the oxidative pressure leach process step, for example by recycling a slurry comprising leached solids and leachate solution.

DETAILED DESCRIPTION OF THE INVENTION

Figure 1:
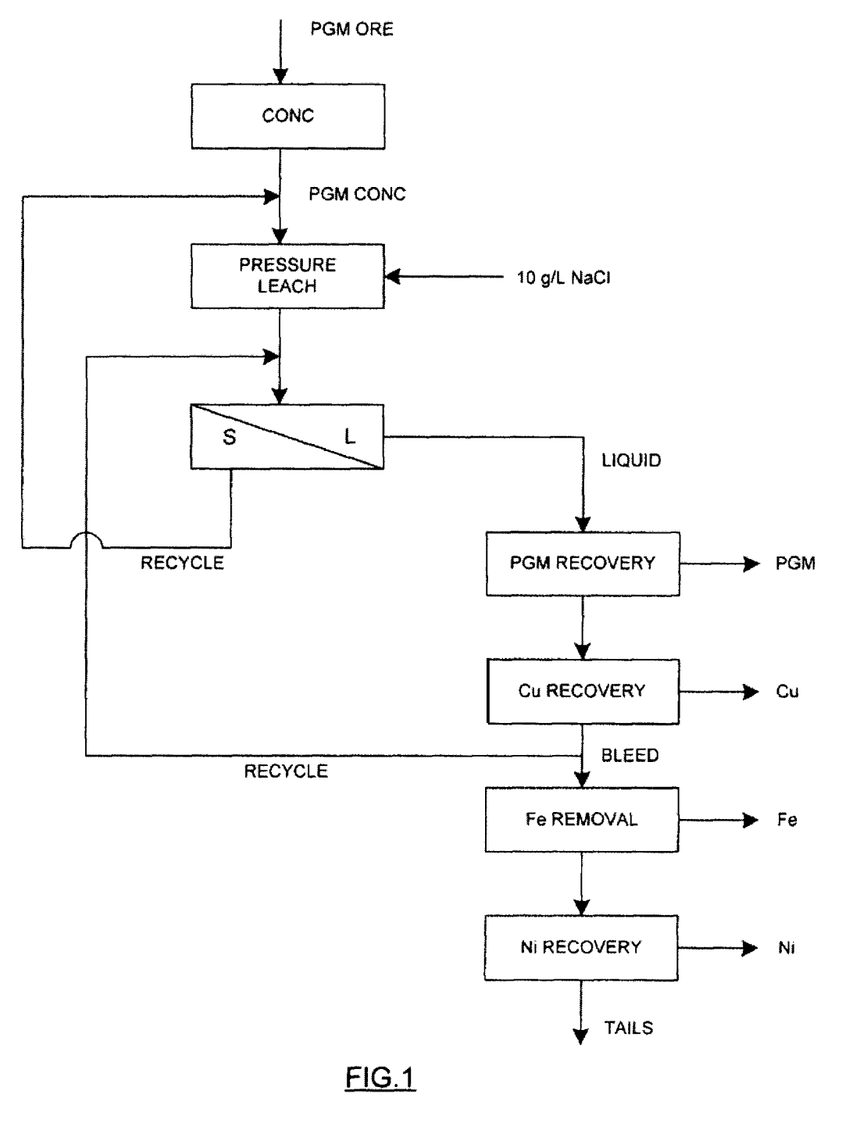
FIG. 1 is a flow sheet illustrating selected aspects of the processes of the invention.

In alternative embodiments, the process of the invention may involve the treatment of ores containing one or more of Cu, Ni, Co, Zn, Au, Ag, Pd, Rh, Ir, Ru, Os, and Pt. As is in part illustrated in FIG. 1, processes of the invention may involve the steps of: crushing, grinding and flotation of ore, such as a PGM ore, to provide a concentrate (CONC); oxidative pressure (autoclave) leaching, in the presence of a halide; solid (S)/liquid (L) separation; solid recycling; precipitation of gold (Au) and platinum group metals (PGM—platinum, iridium, palladium, osmium, ruthenium, and rhodium); solution neutralization; copper solvent extraction and electrowinning; raffinate neutralization; Fe and Al removal; copper removal; nickel, cobalt and zinc recovery; and magnesium removal. Within this process, hydrometallurgical processes may involve chloride-assisted leaching of base and precious metals followed by a series of metal recovery steps for the base and precious metals.

In alternative embodiments, the host material may be in any one of a number of forms, including a primary sulphide or oxide ore body which has been processed by grinding and the like, an ore concentrate, or a secondary material containing precious metals, such as for example a spent oxidation catalyst. The host may also be a matte material from a smelting operation which, in contrast to the ore concentrates, can have precious metal concentrations of up to 10 percent, with the balance being base metals and sulphide.

In some embodiments, it may be desirable either to recover the precious metals and base metals together into the leach solution or, alternatively, use a multiple step process to recover the base metals first and then the precious metals second. For example, in a first step, the base metals can be recovered to a first leach solution using concentrations of oxygen and suitable temperatures to obtain a first leach solution of base metals with residual amounts of sulphuric acid. The precious metals will be retained in the residue and may then be removed in a second phase at the conditions disclosed herein to recover the precious metals to a second leach solution. Solids from the second phase may then be recycled for one or more additional second phase leaching steps. In some embodiments, the first phase may be carried out using just air or oxygen in the absence of a halide ion constituent to recover the base metal constituents as in the form of one or more sulphate complexes, such as copper(II)sulphate, nickel(II)sulphate and cobalt(II)sulphate. In this case, the oxidative leach autoclave of the first phase may be operating at lower temperatures than the oxidative leach process of the second phase, which will have relatively higher temperature and be exposed to the halide ion constituent. Alternatively, the first phase may be carried out in the presence of a halide ion constituent at conditions as disclosed herein to recover the base and precious metal constituents simultaneously.

In some embodiments, the autoclave pressure leaching process of the invention may utilize a relatively small amount of chloride (approximately 10 g/L) in solution under "total pressure oxidation" conditions to extract Cu, Ni, Co, Zn, Au, Ag, Pd, Rh, Ir, Ru, Os, and Pt from a bulk concentrate. In alternative embodiments, the halide ion may be selected from the group consisting of chloride, iodide and bromide ions. In selected embodiments, fluoride is not an option, because it is not sufficiently reactive with (or does not effectively complex with) gold and other precious metals. The halide ion may originate from a halide salt which is added to the leach solution. In some embodiments, the halide ion may be a chloride ion provided to the leach solution by a chloride salt. For example, the chloride salt may include one or more of: sodium chloride, calcium chloride, potassium chloride, ferrous chloride, ferric chloride, hydrochloric acid, cupric chloride, cuprous chloride, lithium chloride, magnesium chloride or ammonium chloride, amongst others. The chloride salt may be provided so that the chloride ion concentration in the leach solution ranges from about 0.5 g/L to about 100 g/L, or from 1 to 20 g/L, or from 1.5 to 10 g/L. In selected embodiments, the chloride ion constituent is present at a concentration ranging from about 3 to about 6 g/L. In one embodiment, the chloride salt is sodium chloride which itself is provided at a concentration of about 10 g/L.

Fresh concentrate may be introduced into the first compartment of an autoclave, such as a 6-compartment autoclave, with raffinate (for controlled cooling of the autoclave slurry) and oxygen (for oxidation). The autoclave oxidation process may be carried out so as to convert metal sulfide minerals into metal sulfates and iron hydrolysis products (such as hematite and basic ferric sulfate). The chemical reactions believed to occur in the autoclave are shown below. (Note that the mineralogy of the PGM's may be very complex, but for simplicity only the metallic species are considered.)

Chalcopyrite Oxidation/Iron Hydrolysis:

$$CuFeS_2+4.25O_2+H_2O \rightarrow CuSO_4+0.5Fe_2O_3+H_2SO_4$$

Pyrite Oxidation:

$$FeS_2+3.75O_2+2H_2O \rightarrow 0.5Fe_2O_3+2H_2SO_4$$

Pyrrhotite Oxidation $$Fe_7S_8+16.25O_2+8H_2O \rightarrow 3.5Fe_2O_3+8H_2SO_4$$

Nickel Sulfide Oxidation:

$$NiS+2O_2 \rightarrow NiSO_4$$

Basic Ferric Sulfate Formation:

$$Fe_2O_3+2H_2SO_4 \rightarrow 2Fe(OH)SO_4+H_2O$$

Gold Oxidation/Chlorocomplex Formation:

$$Au+0.75O_2+4HCl \rightarrow HAuCl_4+1.5H_2O$$

Platinum Oxidation/Chlorocomplex Formation:

$$Pt+O_2+6HCl \rightarrow H_2PtCl_6+2H_2O$$

Palladium Oxidation/Chlorocomplex Formation:

$$Pd+0.5O_2+4HCl \rightarrow H_2PdCl_4+H_2O$$

Accordingly, in one aspect, the invention provides methods for recovering metals from a host material, comprising the steps of: (i) subjecting the host material to an oxidative pressure leach process, in the presence of a leach solution bearing a halide ion constituent which is reactive with the precious metal, and at a temperature sufficient to cause at least a portion of the precious metal to be extracted by said leach solution; (ii) recovering the precious metal from the leach solution; and (iii) recycling at least a portion of the leached solids to the oxidative pressure leach process step.

In selected embodiments, the recycling step involves thickening the pressure oxidation step (i.e. autoclave) discharge and recycling a portion of the leached solids underflow to the autoclave feed. This recycle allows for any unreacted mineral to have a chance at second-pass extraction. The greater the recycle, the longer the average residence time of solids in the autoclave. In some embodiments, the limit of the recycle will be when the solids density in the autoclave becomes unmanageable.

Figure 2:
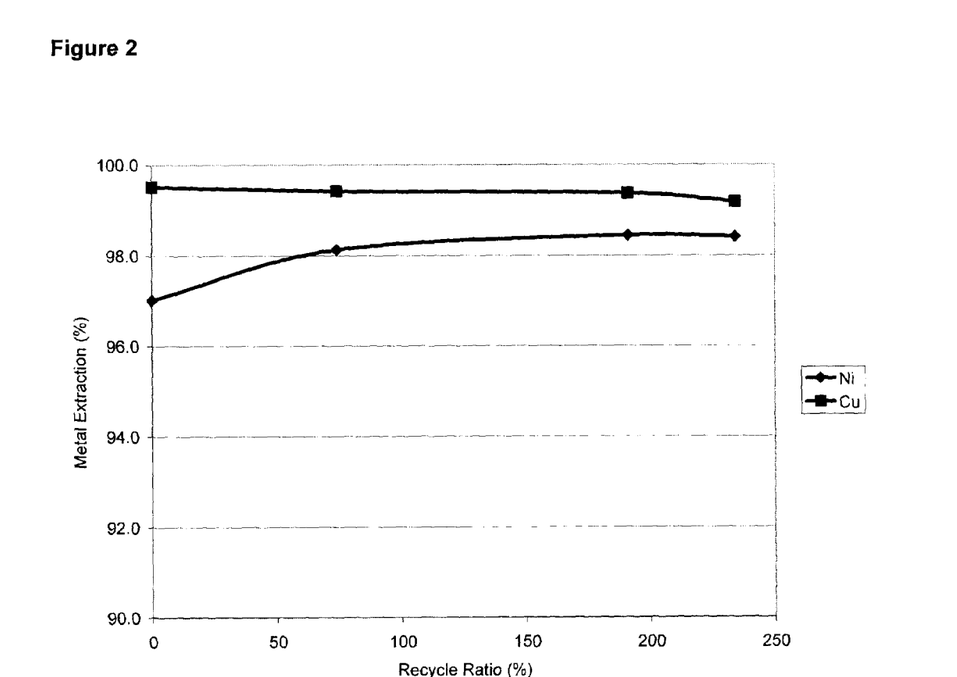
FIG. 2 is a graph showing copper and nickel (Cu and Ni) extraction efficiencies as a function of the recycle rate of autoclave discharge solids, under the following standard conditions: 225° C., 1.1 hour single pass residence time, 100 psig of oxygen overpressure, 10 g/L Cl, 6-compartment continuous autoclave.
Figure 3:
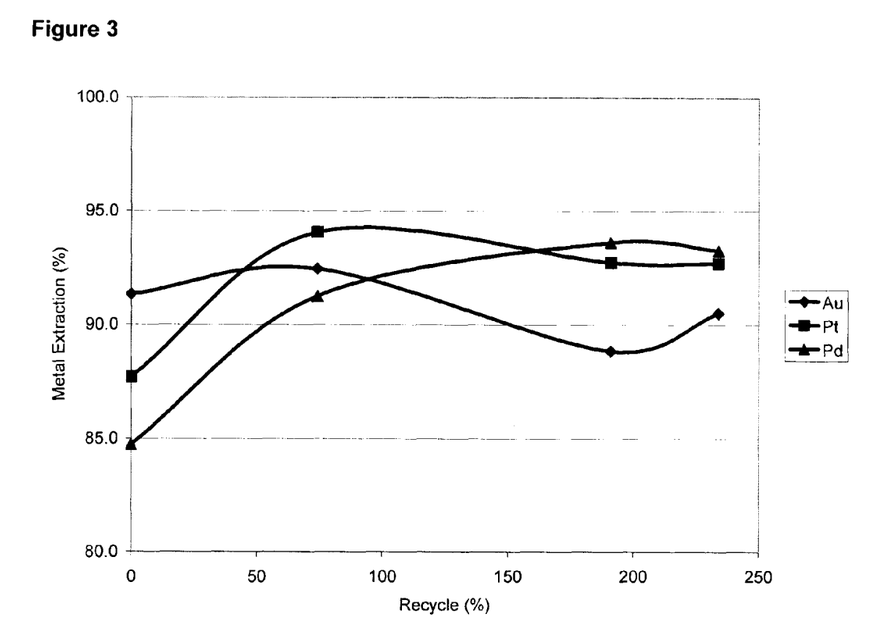
FIG. 3 is a graph showing gold, platinum and palladium (Au, Pt and Pd) extraction efficiencies as a function of the recycle rate of autoclave discharge solids, under the following standard conditions: 225° C., 1.1 hour single pass residence time, 100 psig of oxygen overpressure, 10 g/L Cl, 6-compartment autoclave.

FIGS. 2 and 3 show the impact of recycle on base and precious metal extraction. There is a strong indication of improvement in both base and precious metal extraction in applying the recycle system. Nickel extraction improved from 97% extraction to over 98%, while platinum and palladium extraction improved from less than 90% to between 90 and 95% overall extraction. Regardless of the recycle ratio, the copper extraction was excellent at over 99%. Gold extraction was highly variable, which may be reflective of the small amount of gold in the feed sample (0.8 to 1.3 g/t), but always around 90%. In the Figures, the method of reporting recycle is mass of recycle solids per mass of feed solids (t/t), expressed as a percent.

Figure 4:
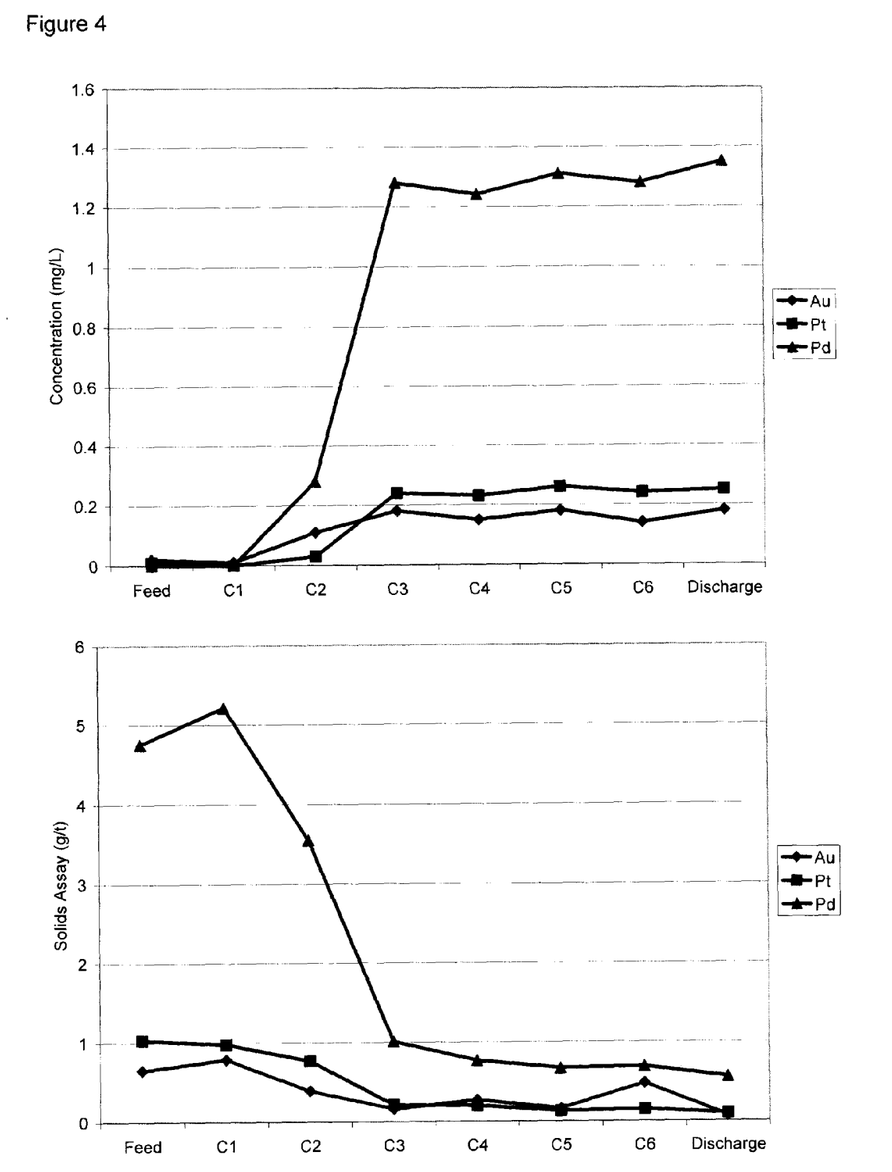
FIG. 4 comprises two graphs showing autoclave compartment sample assays for 74% Recycle Ratio for Au, Pt, Pd at steady state, in which: (a) is solution assays and (b) is solid assays.
Figure 5:
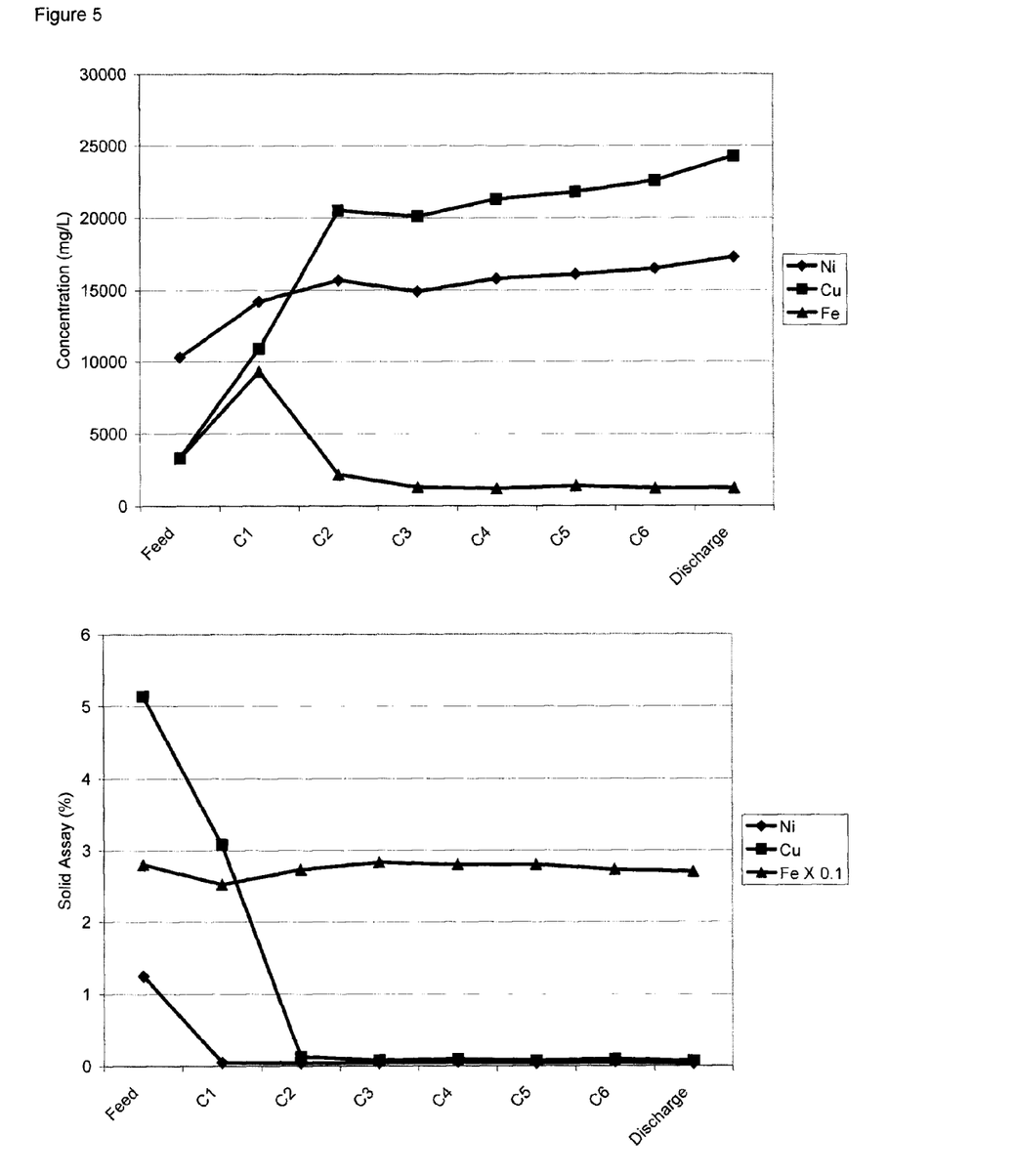
FIG. 5 comprises two graphs showing autoclave compartment sample assays for 74% Recycle Ratio for Ni, Cu, Fe at steady state, in which (a) is solution assays and (b) is solid assays.

In some embodiments, the process may be carried out with a 100% recycle ratio, or an alternative ratio that is any numeric value between 5% and 250%, to improve overall metal extractions. FIG. 4 shows the precious metal solution and solids assays in compartment samples from the autoclave at steady-state, obtained at 74% recycle ratio. FIG. 5 gives the comparable information for the base metals. The feed grades in each case have been diluted with the barren solids recycled from the autoclave discharge. The results show that even with recycle and a relatively short autoclave residence time of 1.1 hours, the oxidation and extraction of the bulk of the base and precious metals is largely complete within the first two compartments of the autoclave (approximately 22 minutes of the 66 minute residence time). In some embodiments, the process may allow up to 300% recycle capacity. The use of recycle may allow the specific throughput of the autoclaves to improve with respect to fresh feed (tonnes of fresh feed per m$^3$ of autoclave volume per unit time).

In some embodiments, before recovering the precious metal from the leach solution, leached solids may be separated from the leach solution, although it may be desirable in some cases to recover the precious metal from the leach solution before separating the leached solids, for example to minimize the loss of precious metals contained in the residual leach solution which can be lost with the separated solids. In such embodiments, at least a portion of the leached solids that have been separated from the leach solution may be recycled to the oxidative pressure leach process step.

In selected embodiments, the oxidative pressure leach process takes place in the presence of a gaseous oxidant. For example, the gaseous oxidant may be oxygen gas. The gaseous oxidant, such as oxygen gas, may be injected into the leach vessel at an oxygen partial pressure of between 1 and 500 psig, or between 10 and 200 psig, or between 50 and 100 psig. Other oxidants may also be effective including chlorine, the ferric ion, hydrogen peroxide and Caro's acid.

In alternative embodiments, the temperature in the leach vessel ranges from about 170 degrees Celsius to about 300 degrees Celsius, or from about 195 degrees Celsius to about 275 degrees Celsius, or from about 200 degrees Celsius to 250 degrees Celsius, or from 210 degrees Celsius to about 230 degrees Celsius. In selected embodiments, the temperature range for total pressure oxidation is typically 220 to 230 degrees Celsius.

The leach solution may be acidic, and the acid constituent may be sulphuric acid at a concentration ranging from 1 to 500 g/L, or from about 5 to about 250 g/L, or from about 10 to about 100 g/L.

An elevated oxidation potential may be maintained in the leach solution during the leach (for example at levels greater than 500 mV versus Ag/AgCl) so as to maintain precious metal leaching efficiencies in the process. This can be done by oxidizing, as completely as possible, any reduced species such as sulphide ions or sulphur in the feed to the process, for example. It may also be done by converting most of the ferrous ion in solution to ferric ion. In addition, a tramp iron constituent, which is added as a consequence of grinding or re-grinding the feed to the process, may also contribute to a reduction in the precious metal recovery. This is especially true in the case of gold.

In alternative embodiments, the pressure oxidation autoclave discharge slurry may be partly recycled (after thickening) and partly filtered to advance the metal bearing solution to the downstream recovery steps in the process. The gold and platinum group metals in solution may be the first target for recovery using reductive precipitation. A combination of sulfur dioxide reduction of ferric ion followed by sulfide precipitation may be used to recover the precious metals from the pregnant solution.

In alternative embodiments, copper sulfides, for example produced by precipitation of copper from the bleed stream as it advances to nickel and cobalt recovery, may be utilized for precious metal recovery. In this embodiment, the copper sulfides may be used so as to "cement" the precious metals onto the solid surface, resulting in an enriched product to advance to further processing. In selected embodiments, it may still be advantageous to reduce the ferric species in the advancing solution using sulfur dioxide gas. Putative steps in this process are as follows:

Ferric Reduction

Gold Precipitation

Platinum Precipitation

Palladium Precipitation

Accordingly, the recovery of gold, platinum and palladium from the autoclave solution (after filtering and washing the solids) may be accomplished by precipitation with CuS. The precipitate solids may for example be collected in a thickener/clarifier arrangement and then filtered. Recoveries of gold, platinum and palladium into this precipitate concentrate may be in excess of 99.5%. The process may be adapted so that base metal losses from solution into the PGM and gold residue are negligible.

In one embodiment, approximately 4 kg of precipitate was collected, comprising: 56 g/t Au, 211 g/t Pt and 907 g/t Pd. Most of the precipitate mass was copper (35.7%) and sulfur (49%). Batch re-leaching of the precipitate to remove copper and sulfur resulted in an upgraded material analyzing approximately 1.6% or 16,000 g/t total contained gold, platinum and palladium.

In various embodiments, the solution after gold, platinum and palladium recovery may be advanced to base metal recovery. The solution may still be acidic, and may be neutralized prior to copper solvent extraction, because the extraction of copper by solvent extraction may be inhibited by acid in solution.

The process may include the recovery of copper, for example by solvent extraction and electrowinning (SX/EW). The presence of chloride in the feed solution to copper solvent extraction may necessitate the application of a wash or scrub step to displace any entrained chloride from the loaded organic solution.

In some embodiments, the invention may involve a raffinate neutralization step, to trim the acid level in the copper raffinate prior to splitting the raffinate flow between a nickel and cobalt recovery circuit, and returning the raffinate to the autoclave circuit as a cooling solution. In some embodiments, acid may be neutralized prior to the nickel and cobalt recovery process steps and excess acid may be undesirable in the feed to the autoclave, as excess acid will increase the formation of basic ferric sulfate in the autoclave solids.

In some embodiments, the removal of iron and aluminum prior to recovery of nickel and cobalt may be necessary to prevent product contamination. This may for example be accomplished using a process of iron oxy-hydrolysis, in which iron is oxidized from the ferrous to the ferric state with oxygen or air with limestone addition for neutralization and pH control. The temperature for iron removal may for example be set to about 60° C. and the pH to about 3.0. Iron may be removed to less than about 5 mg/L by this process, with negligible losses of Ni/Co to the iron precipitate residue. Iron precipitate may be washed and disposed to tailings. Aluminum precipitate may be thickened and recycled to the iron removal step.

Residual copper may be removed before nickel, cobalt and zinc recovery, for example using NaSH precipitation. The copper sulfide product (synthetic covellite) may then be recycled internally to precipitate gold and PGM from the autoclave discharge solution.

Alternative processes are available for nickel, cobalt and zinc recovery. For example, a mixed hydroxide precipitation route may be used for recovery of the pay metals in a single product. Alternatively, cobalt and zinc may be separated away from nickel using solvent extraction, followed by selective stripping of cobalt and zinc. The purified nickel solution may then be precipitated as a nickel hydroxide product. Similar hydroxide products may be formed from the cobalt and zinc strip solutions. Alternative precipitates or processing methods are possible.

During high temperature autoclave leaching of the concentrate, some magnesium may be leached. In addition, magnesia may be used around the circuit for nickel and cobalt precipitation, which results in an increase in the magnesium content of recirculating solutions. In order to control the build-up of magnesium in solution, a magnesium removal step (with lime) may be introduced into the circuit. Magnesium sulfate reacts to form magnesium hydroxide and gypsum with lime.

Magnesium Precipitation with Lime $$MgSO_4+CaO+3H_2O \rightarrow Mg(OH)_2+CaSO_4.2H_2O$$

In another aspect of the present invention, there is provided a method for recovering a precious metal from a host material, comprising the steps of: (i) placing the host material in a pressure leaching vessel; (ii) subjecting the host material to an oxidative pressure leach process, in the presence of a halide ion constituent which is reactive with the precious metal, and at a temperature sufficient to cause at least a portion of the precious metal to be extracted by a leach solution; (iii) recovering the precious metal from the leach solution; and, (iii) recycling at least a portion of the leached solids to the oxidative pressure leach process step.

In alternative aspects, the invention provides a method for recovering a precious metal from a smelter matte material, wherein said matte material includes a precious metal constituent and a base metal constituent, comprising the steps of: (i) subjecting said matte material to a first oxidative pressure leach process, with sufficient oxidant and at a selected temperature to recover substantially all of said base metal constituent in the form of at least one sulphate complex into a first leach solution; (ii) subjecting said host material to a second oxidative pressure leach process, in the presence of a halide ion constituent which is reactive with said precious metal, and at a temperature sufficient to cause at least a portion of said precious metal to be recovered into a second leach solution; (iii) recovering said precious metal from said leach solution; and, (iv) recycling at least a portion of the leached solids to the second oxidative pressure leach process step. In selected embodiments, the first oxidative pressure leach process occurs at a temperature ranging from 100 to 190 degrees Celsius, or from 120 to 170 degrees Celsius, or from 130 to 150 degrees Celsius.

In alternative aspects, the invention provides a method for recovering a precious metal from a smelter matte material, wherein said matte material includes a precious metal constituent and a base metal constituent, comprising the steps of: (i) subjecting said matte material to a single oxidative pressure leach process, in the presence of a halide ion constituent which is reactive with said precious metal constituent, and at a temperature sufficient to cause substantially all of said base metal and precious metal constituents to be recovered into a first leach solution; (ii) recovering said base and precious metal constituents from said leach solution; and, (iii) recycling at least a portion of the leached solids to the oxidative pressure leach process step.

In alternative aspects, the invention provides a method for recovering a platinum group metal or gold from a host material, comprising the steps of: (i) subjecting the host material to an oxidative pressure leach process, in the presence of a leach solution bearing a halide ion constituent which is reactive with the platinum group metal or gold, and at a temperature sufficient to cause at least a portion of the platinum group metal or gold to be extracted by said leach solution; (ii) recovering the platinum group metal or gold from the leach solution; and, (iii) recycling at least a portion of the leached solids to the oxidative pressure leach process step.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing. Citation of references herein is not an admission that such references are prior art to the present invention. Any priority document(s) and all publications, including but not limited to patents and patent applications, cited in this specification are incorporated herein by reference as if each individual publication were specifically and individually indicated to be incorporated by reference herein and as though fully set forth herein. The invention includes all embodiments and variations substantially as hereinbefore described and with reference to the examples and drawings.

The invention claimed is:

1. A process for improving the recovery of a precious metal from a host material comprising a base metal and the precious metal, comprising the steps of:
   subjecting the host material to an oxidative pressure leach process, in the presence of a leach solution bearing a halide ion constituent which is reactive with the precious metal and the base metal, at a temperature sufficient to cause at least a portion of the base metal and only a portion of the precious metal to be extracted into a leachate solution to provide leached solids;
   separating the leached solids from the leachate solution to provide separated leached solids;
   recovering precious metal and base metal from the leachate solution; and
   recycling, after separating the leached solids from the leachate solution, at least 50% of the separated leached solids comprising at least a portion of the precious metal to the oxidative pressure leach process step, so as to increase the portion of precious metal recovered from the leachate solution,
   wherein the precious metal comprises at least one of gold, platinum or palladium, and
   wherein the base metal comprises at least one of nickel, copper, zinc or cobalt.

2. The process of claim 1, wherein a recycle rate of separated leached solids recycled to the oxidative pressure leach process step is between 50% and 500%.

3. The process of claim 1, wherein a recycle rate of separated leached solids recycled to the oxidative pressure leach process step is between 50% and 250%.

4. The process of claim 1, wherein the oxidative pressure leach process step is carried out at 200 to 250 degrees Celsius, for 0.5 to 1.5 hours of single pass residence time, at 50 to 150 psig of oxygen overpressure, with 5 to 10 g/L chloride ion concentration.

5. The process of claim 1, wherein the base metal comprises nickel, and wherein nickel extraction efficiency is greater than 98%.

6. The process of claim 1, wherein the base metal comprises copper, and wherein copper extraction efficiency is greater than 98%.

7. The process of claim 1, wherein the base metal comprises zinc, and wherein zinc extraction efficiency is greater than 98%.

8. The process claim 1, wherein the base metal comprises cobalt, and wherein cobalt extraction efficiency is greater than 98%.

9. The process of claim 1, wherein the precious metal comprises gold, and wherein gold extraction efficiency is greater than 90%.

10. The process of claim 1, wherein the precious metal comprises platinum, and wherein platinum extraction efficiency is greater than 90%.

11. The process of claim 1, wherein the precious metal comprises palladium, and wherein palladium extraction efficiency is greater than 90%.

* * * * *